W. ELWELL.
Clod-Crusher.
No 49,513.
Patented Aug. 22, 1865.
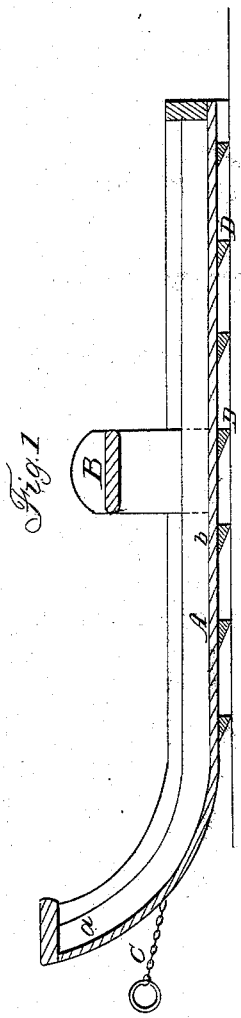
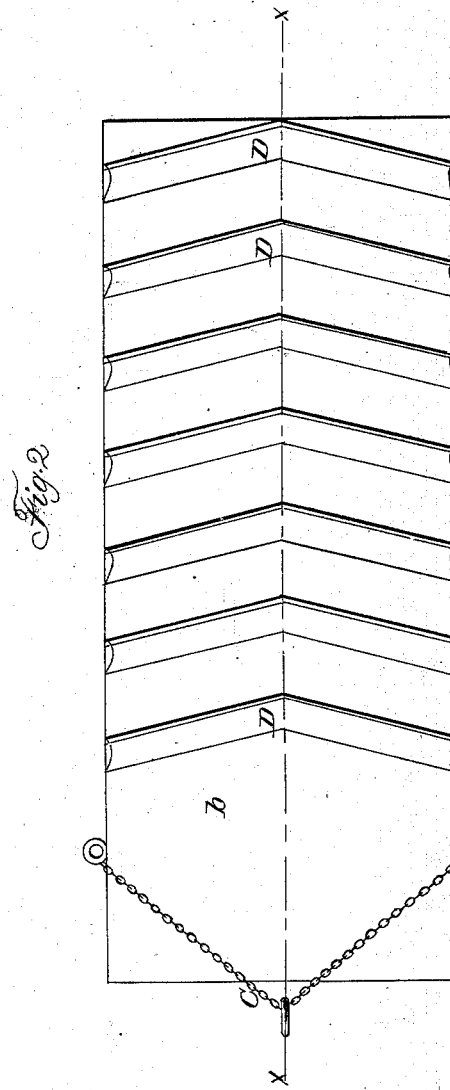
Witnesses:
Wm Treurn
Theo Tusch
Inventor:
Wm Elwell

UNITED STATES PATENT OFFICE.

WILLIAM ELWELL, OF GARDINER, MAINE.

IMPROVEMENT IN EARTH-PULVERIZERS.

Specification forming part of Letters Patent No. 49,513, dated August 22, 1865.

*To all whom it may concern:*

Be it known that I, WILLIAM ELWELL, of Gardiner, in the county of Kennebec and State of Maine, have invented a new and Improved Earth-Pulverizer; and I do hereby declare that the following is a full, clear, and exact description thereof, which will enable others skilled in the art to make and use the same, reference being had to the accompanying drawings, forming part of this specification, in which—

Figure 1 is a longitudinal section of my invention, taken in the line $x\ x$, Fig. 2. Fig. 2 is a bottom view of the same.

Similar letters of reference indicate like parts.

The object of my invention is to produce a simple method for pulverizing the earth after plowing and for covering seed after sowing in an effectual and superior manner.

My invention consists in securing on the bottom of a drag or other suitable device or machine having a flat bottom a number of triangular-shaped strips, either of metal or wood, which, while the machine is being drawn along, will strike against the lumps of earth and pulverize the same, as well as cover seed after it has been sown.

To enable others to fully understand the peculiarities of this invention, I will proceed to describe it.

The body of the machine in the present instance is formed much like a drag, or a sleigh-box with the runners removed. It consists of two side pieces, A, curved upward at one end, as shown at $a$, so as to enable it to glide freely over the uneven surface of the ground. To the bottom of these side strips boards $b$ are nailed for their entire length, and a seat, B, is mounted in a proper place on the machine, to provide a place for the driver thereof to sit while using the machine.

C is a chain secured to the front of the machine, to which the draft-animals are to be hitched.

On the bottom of the machine I attach a number of strips, D, which are beveled on their forward sides, as shown in Fig. 2. There is a row of them on each half of the bottom. Their line of direction is across the machine, and they are secured so that the point at which the two strips meet will be nearer the rear end of the machine than the other—that is to say, they are placed at angles with each other, the apex being toward the rear of the machine. By placing the strips in this way it renders them more effective, for, instead of throwing the lumps of earth out at each side of the machine without crushing them, the tendency of the lumps will be rather toward the center of the board, where they will be crushed in the passage of the machine over them. These strips may be made of either metal or wood.

This machine can be cheaply made, it is so very simple in construction. It has been practically tested, and the ground operated upon by it has been found to be very light and fine, when before it was covered with hard dry lumps. It makes the surface of the plowed lot smooth and level, so that it will be in a good condition for sowing seed. In cases where seed has been sown in an uneven ground, by passing this machine over the surface thereof it will be evened off and the seed covered without drawing it into bunches, which many other machines for the same purpose are likely to do.

What I claim as new, and desire to secure by Letters Patent, is—

The angular strips D, constructed and arranged substantially as described, in combination with a suitable machine that will admit their application in the manner and for the purposes herein specified.

The above specification of my invention signed by me this 26th day of June, 1865.

WILLIAM ELWELL.

Witnesses:
N. O. MITCHELL,
BENJAMIN JORDAN.